(12) United States Patent
Lee et al.

(10) Patent No.: US 10,652,628 B2
(45) Date of Patent: May 12, 2020

(54) TRANSMITTER, RECEIVER, AND CONTROLLING METHOD THEREOF

(71) Applicant: SAMSUNG ELECTRONICS CO., LTD., Suwon-si (KR)

(72) Inventors: Hak-ju Lee, Seoul (KR); Young-ho Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/496,388

(22) Filed: Sep. 25, 2014

(65) Prior Publication Data
US 2015/0095943 A1 Apr. 2, 2015

(30) Foreign Application Priority Data
Sep. 27, 2013 (KR) .................. 10-2013-0115400

(51) Int. Cl.
*H04N 21/81* (2011.01)
*H04N 21/236* (2011.01)
(Continued)

(52) U.S. Cl.
CPC ......... *H04N 21/814* (2013.01); *H04L 1/0041* (2013.01); *H04L 1/0045* (2013.01);
(Continued)

(58) Field of Classification Search
None
See application file for complete search history.

(56) References Cited

U.S. PATENT DOCUMENTS

| 2005/0086685 A1* | 4/2005 | Rahman | H04L 67/12 725/33 |
| 2006/0015898 A1* | 1/2006 | Kim | H04N 7/08 725/33 |

(Continued)

FOREIGN PATENT DOCUMENTS

| JP | 2010-283845 A | 12/2010 | |
| WO | WO 2015/026803 A1 * | 2/2015 | .......... H04H 20/59 |

OTHER PUBLICATIONS

Communication dated Dec. 17, 2014 issued by the Int. Searching Authority in counterpart Int. Application No. PCT/KR2014/008755 (PCT/ISA/210).

(Continued)

*Primary Examiner* — Michael R Telan
(74) *Attorney, Agent, or Firm* — Sughrue Mion, PLLC

(57) ABSTRACT

A transmitter and a receiver of data frames and related methods are disclosed. The transmitter includes: a frame generator configured to generate a first frame comprising data to be transmitted; and a preamble inserter configured to insert a preamble into the first frame, wherein the preamble inserter is further configured to insert, in the preamble, emergency alert service (EAS) information related to a preset emergency alert event, and set an indicator in the frame to indicate whether the EAS information is inserted in the preamble. Accordingly, only important information related to the EAS is transmitted in the form of a preamble to achieve robust transmission, and L1 information of related data is directly transmitted to reduce power consumption.

10 Claims, 14 Drawing Sheets

(51) Int. Cl.
*H04N 21/434* (2011.01)
*H04N 21/61* (2011.01)
*H04L 1/00* (2006.01)

(52) U.S. Cl.
CPC ..... *H04L 1/0057* (2013.01); *H04N 21/23614* (2013.01); *H04N 21/4345* (2013.01); *H04N 21/6112* (2013.01); *H04L 1/0071* (2013.01)

(56) References Cited

U.S. PATENT DOCUMENTS

| | | | |
|---|---|---|---|
| 2007/0209052 A1* | 9/2007 | Taylor | H04N 5/4401 |
| | | | 725/86 |
| 2008/0120645 A1 | 5/2008 | Yun et al. | |
| 2009/0271832 A1* | 10/2009 | Park | H04N 7/17318 |
| | | | 725/98 |
| 2010/0158047 A1* | 6/2010 | Lee | H04H 20/103 |
| | | | 370/474 |
| 2010/0186029 A1 | 7/2010 | Kim et al. | |
| 2010/0186030 A1 | 7/2010 | Yun et al. | |
| 2012/0079531 A1 | 3/2012 | Hasek et al. | |
| 2013/0039303 A1* | 2/2013 | Stadelmeier | H04H 60/07 |
| | | | 370/329 |

OTHER PUBLICATIONS

Communication dated Dec. 17, 2014 issued by the Int. Searching Authority in counterpart Int. Application No. PCT/KR2014/008755 (PCT/ISA/237).

* cited by examiner

FIG. 4

| Syntax | Bits | Comments |
|---|---|---|
| Event_ID | 16 | ID FOR EACH DISASTER EVENT |
| Event_version | 8 | INDICATE VERSION FOR EACH EVENT |
| Event_type | 8 | TYPE OF DISASTER (EARTHQUAKE, SURGE) |
| Event_location | 16 | ORIGIN AREA (WIDE AREA) |
| Event_location_extension | 16 | WHEN INFORMATION NEEDS TO BE PROVIDED PER DETAILED AREA |
| Event_description_length | 32 | |
| Event_description () | 8*N | INDICATE DETAILED DESCRIPTION |
| Relative_PLP_ID | 8 | ASSOCIATED PLP_ID |
| In-band signaling () | 8*N | PROVIDE INBAND INFORMATION ABOUT ASSOCIATED PLP |
| | | |

FIG. 5

| |
|---|
| Pilot |
| Preamble Cell |
| Preamble Cell |
| Pilot |
| Preamble Cell |
| Preamble Cell |
| Pilot |
| Preamble Cell |
| Preamble Cell |
| Pilot |
| Preamble Cell |
| Preamble Cell |

...

| |
|---|
| Pilot |
| Preamble Cell |
| Preamble Cell |
| Pilot |

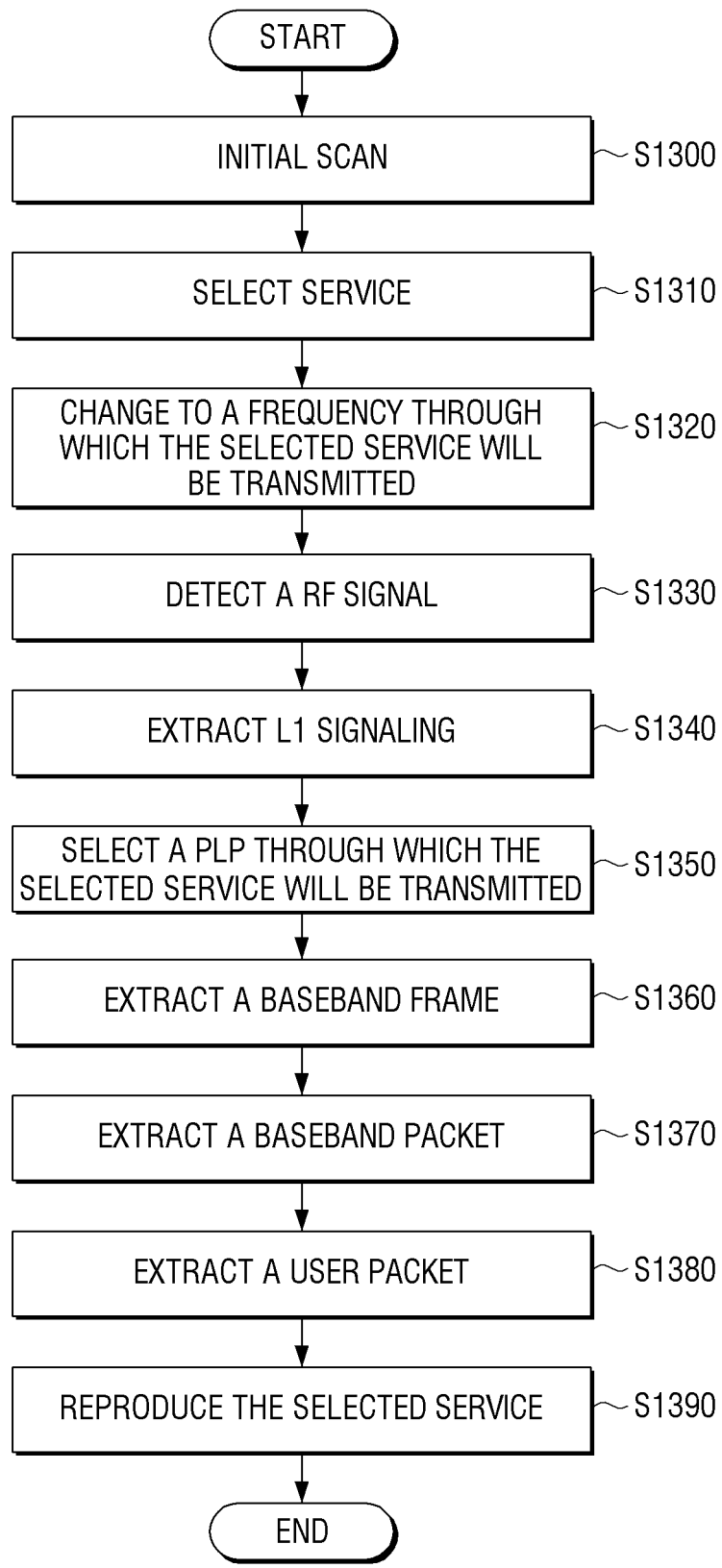

TRANSMITTER, RECEIVER, AND CONTROLLING METHOD THEREOF

CROSS-REFERENCE TO RELATED APPLICATIONS

This application claims priority from Korean Patent Application No. 10-2013-0115400, filed on Sep. 27, 2013, in the Korean Intellectual Property Office, the disclosure of which is incorporated herein in its entirely by reference.

BACKGROUND

1. Field

Apparatuses and methods consistent with exemplary embodiments of the inventive concept relate to a transmitter, a receiver, and a controlling method for digital broadcasting.

2. Description of the Related Art

Digital Video Broadcasting the Second Generation Terrestrial (DVB-T2) is the second generation European terrestrial digital broadcast standard obtained via improvement in performance of DVB-T, which has been currently adapted as standard by 35 or more countries including European Union countries around the world and has begun services. DVB-T2 applies recent technologies such as low density parity check (LDPC) coding, 256 QAM modulation, and so on, thereby increasing transmission efficiency and bandwidth efficiency. Accordingly, it is advantageous to provide various high quality services such as high-definition TV (HDTV) to a limited band HDTV.

There is a need to provide an emergency alert and associated information through a broadcast network considering that the broadcast network has a higher stability compared with a communication network and is able to simultaneously provide services to a plurality of users when a disaster occurs. However, a related art system does not provide robust transmission of emergency alert service (EAS) information.

SUMMARY

One or more exemplary embodiments of the inventive concept overcome the above disadvantages and other disadvantages not described above. Also, the inventive concept is not required to overcome the disadvantages described above, and exemplary embodiments of the inventive concept described herein may not overcome any of the problems described above.

One or more exemplary embodiments of the inventive concept provide a transmitter, a receiver, and a controlling method thereof, for inserting the emergency alert service (EAS) information into a frame when an emergency alert event occurs.

According to an aspect of an exemplary embodiment of the inventive concept, there is provided a transmitter which may include: a frame generator configured to generate a first frame comprising data to be transmitted; and a preamble inserter configured to insert a preamble into the first frame, wherein the preamble inserter is further configured to insert, in the preamble, EAS information related to a preset emergency alert event, and set an indicator in the frame to indicate whether the EAS information is inserted in the preamble.

The preamble inserter may be further configured to generate an additional preamble to include the EAS information therein and insert the additional preamble in the first frame.

The EAS message may include location information indicating a location of data related to the emergency alert event in a data region of the first frame.

The preamble inserter may add in-band information to the data region indicated by the location information, and the in-band information may include information indicating a location of additional data related to the emergency alert event in a data region in at least one frame subsequent to the first frame.

The EAS information may include at least one of Event_ID of the emergency alert event, Event_version indicating a version of the emergency alert event, Event_type indicating a type of the emergency alert event, Event_location indicating an area of the emergency alert event, Event_location_extension indicating detailed information about the area, Event_description and Event_description_length indicating detailed information and size of the emergency alert event, and Relative_PLP_ID indicating an identifier of data associated with the emergency alert event in the first frame.

The preamble inserter may insert the EAS information in a P2 symbol of the first frame which is a T2 frame used in Digital Video Broadcasting the Second Generation Terrestrial (DVB-T2).

According to an aspect of another exemplary embodiment of the inventive concept, there is provided a receiver which may include: a reception unit configured to receive a first frame comprising a preamble and data; and a preamble detector configured to determine whether EAS information related to a preset emergency alert event is inserted in the preamble according to an indicator set in the first frame, and extract the EAS information from the preamble based on a result of the determination.

The preamble detector may be further configured to detect an additional preamble which includes the EAS information from the first frame according to the indicator.

The EAS information may include location information indicating a location of data related to the emergency alert event in a data region of the first frame.

The receiver may further include a controller configured to detect the data related to the emergency alert event from the data region of the first frame based on the location information.

The controller may detect additional data related to the emergency alert event from a data region of at least one frame subsequent to the first frame according to in-band information included in the detected data, and the in-band information may be information indicating a location of the additional data in the at least one subsequent frame.

The EAS information may include at least one of Event_ID of the emergency alert event, Event_version indicating a version of the emergency alert event, Event_type indicating a type of the emergency alert event, Event_location indicating an area of the emergency alert event, Event_location_extension indicating detailed information about the area, Event_description and Event_description_length indicating detailed information and size of the emergency alert event, and Relative_PLP_ID indicating an identifier of data associated with the emergency alert event in the first frame.

The in-band information may include information about a version of the EAS information, and the controller may receive and processes EAS information of a changed version when the version of the EAS information is changed.

The preamble detector may detect the EAS information from a P2 symbol of the first frame which is a T2 frame used in DVB-T2.

According to an aspect of still another exemplary embodiment of the inventive concept, there is provided a controlling method of a transmitter which may include: generating a first frame comprising data to be transmitted; inserting a preamble into the frame; and inserting, in the preamble, EAS information related to a preset emergency alert event, and setting an indicator in the first frame to indicate whether the EAS information is inserted in the preamble.

The EAS information may include location information indicating a location of data related to the emergency alert event in a data region of the first frame.

The method may further include adding in-band information to the data region of the first frame, wherein the in-band information is information indicating a location of additional data related to the emergency alert event in a data region in at least one frame subsequent to the first frame.

The EAS information may include at least one of Event_ID of the emergency alert event, Event_version indicating a version of the emergency alert event, Event_type indicating a type of the emergency alert event, Event_location indicating an area of the emergency alert event, Event_location_extension indicating detailed information about the area, Event_description and Event_description_length indicating detailed information and size of the emergency alert event, and Relative_PLP_ID indicating an identifier of data associated with the emergency alert event in the first frame.

The EAS information may be inserted in a P2 symbol of the first frame which is a T2 frame used in DVB-T2.

According to an aspect of still another exemplary embodiment of the inventive concept, there is provided a controlling method of a receiver which may include: receiving a first frame comprising a preamble and data; and determining whether EAS information related to a preset emergency alert event is inserted in the preamble according to an indicator set in the first frame, and extracting the EAS information from the preamble based on a result of the determining.

The EAS information may include location information indicating a location of data related to the emergency alert event in a data region of the first frame.

The method may further include detecting the data related to the emergency alert event from the data region of the first frame based on the location information.

The method may further include detecting additional data related to the emergency alert event from a data region of at least one frame subsequent to the first frame according to in-band information included in the detected data, wherein the in-band information includes information indicating a location of the additional data in the at least one subsequent frame.

The EAS information may include at least one of Event_ID of the emergency alert event, Event_version indicating a version of the emergency alert event, Event_type indicating a type of the emergency alert event, Event_location indicating an area of the emergency alert event, Event_location_extension indicating detailed information about the area, Event_description and Event_description_length indicating detailed information and size of the emergency alert event, and Relative_PLP_ID indicating an identifier of data associated with the emergency alert event in the first frame.

The in-band information may include information about a version of the EAS information, and the method may further include receiving and processing EAS information according to a changed version when the version of the EAS information is changed.

The EAS information is detected from a P2 symbol of the first frame which is a T2 frame used in Digital Video Broadcasting the Second Generation Terrestrial (DVB-T2).

According to the above embodiments of inventive concept, only important information associated with EAS may be transmitted in the form of preamble to achieve robust transmission, and L1 information of related data may be directly transmitted to reduce power consumption.

Additional and/or other aspects of the inventive concept will be set forth in part in the description which follows and, in part, will be obvious from the description, or may be learned by practice of the exemplary embodiments.

BRIEF DESCRIPTION OF THE DRAWING FIGURES

The above and/or other aspects of the inventive concept will be more apparent by describing certain exemplary embodiments of the inventive concept with reference to the accompanying drawings, in which:

FIG. 4 is a diagram illustrating a configuration of an EAS message according to an exemplary embodiment of the inventive concept;

FIG. 5 is a diagram illustrating an orthogonal frequency division multiplexing (OFDM) symbol structure of an additional preamble including an EAS message according to an exemplary embodiment of the inventive concept;

FIG. 13 is a flowchart provided to briefly demonstrate an operation of a receiving apparatus from the moment when a user selects a service until the actally selected service is reproduced, according to an exemplary embodiment.

DETAILED DESCRIPTION OF THE EXEMPLARY EMBODIMENTS

Certain exemplary embodiments of the inventive concept will now be described in greater detail with reference to the accompanying drawings.

Figure 1:
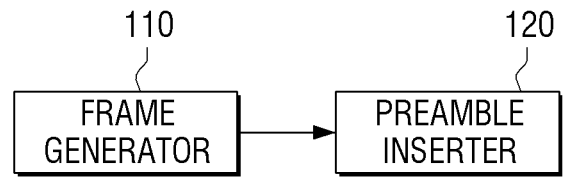
FIG. 1 is a block diagram illustrating a transmitter according to an embodiment of the inventive concept.

FIG. 1 is a block diagram illustrating a transmitter 100 according to an exemplary embodiment of the inventive concept.

Referring to FIG. 1, the transmitter 100 may include a frame generator 110 and a preamble inserter 120.

Here, the transmitter 100 may be a digital broadcast signal transmitter. The transmitter 100 digitizes and processes a broadcast signal such as video, images, audio, data, and so on, and then, transmits the broadcast signal to a transmitting system. A digital broadcast system is configured to operate individual devices such as a microphone, a video camera, a video tape recorder (VTR), a video effect device, a signal switch, and so on in a digital manner and to broadcast digital broadcast signals in a standardized digital broadcast manner. As an expected effect of using the transmitter 100 like the digital broadcast signal transmitter, image and sound quality as in a studio may be realized, regular quality reception may be possible anywhere, or multi-channel programs may be provided by virtue of development of compression modulation technologies. In addition, although current analog broadcasting uses different modulation schemes according to TV, voice, and data broadcasts, digital broadcasting can transmit broadcast signals using the same modulation scheme, and thus, a new service such as a multimedia service or a conversation service may be easily introduced using one broadcast wave, and various reception type services such as stable mobile portable reception can be expected.

The frame generator 110 of the transmitter 100 may generate a frame which includes various data to be transmitted.

According to an exemplary embodiment of the inventive concept, the transmitter 100 transmits a plurality of signals using Digital Video Broadcasting the Second Generation Terrestrial (DVB-T2). A unit for transmitting data using DVB-T2 is referred to as a T2 frame.

Hereinafter, a DVB-T2 system and a frame configuration will be described.

Figure 2A:
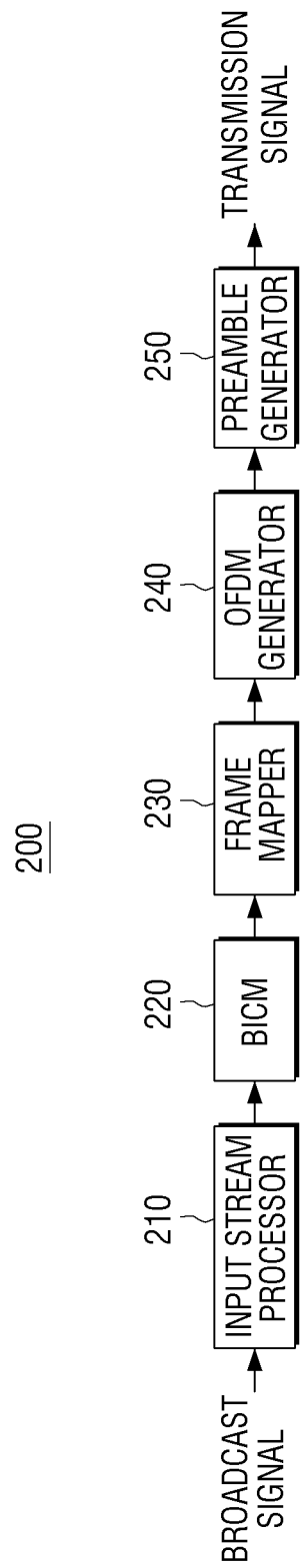
FIGS. 2A and 2B are block diagrams of a DVB-T2 system and a frame structure according to an exemplary embodiment of the inventive concept.
Figure 2B:
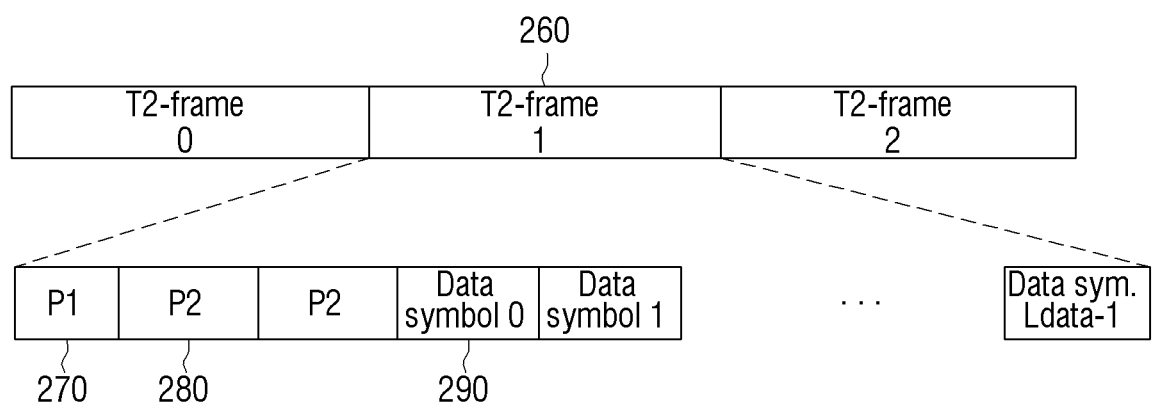

FIGS. 2A and 2B are block diagrams of a DVB-T2 system and a frame structure according to an exemplary embodiment of the inventive concept.

FIG. 2A illustrates a transmitter for generating a T2 frame using a transmission method of DVB-T2. An input stream processor 210 may process an input broadcast signal to generate a baseband frame format signal.

In addition, a bit-interleaved coded modulation (BICM) operator 220 may encode the baseband frame format signal using low density parity check (LDPC) and modulate the encoded signal.

Here, according to the DVB-T2 method, LDPC codes with lengths 64,800 bits and 16,400 bits are used, and an input signal may be encoded at various code rates. The encoded signal may be modulated via quadrature phase shift keying (QPSK), 16 quadrature amplitude modulation (QAM), 64 QAM, or 256 QAM.

In addition, a frame mapper 230 may generate a T2 frame configuration for orthogonal frequency division multiplexing (OFDM) transmission. Here, the T2 frame configuration may include a data subcarrier for transmitting a signal obtained by modulating a broadcast signal, a pilot for channel estimation, and subcarriers (or reserved tones) for reducing peak to average power ratio (PAPR).

An OFDM generator 240 may convert a signal input from the frame mapper 230 into a signal in the time domain using an inverse fast Fourier transform (IFFT) method for converting a signal in the frequency domain into a signal in the time domain.

In addition, a preamble generator 250 may add a preamble to a start portion of a T2 frame to generate a transmission signal for synchronization of the T2 frame. FIG. 2B illustrates a configurations of a plurality of T2 frames in the time domain according to DVB-T2. One T2 frame 260 may include a P1 preamble symbol 270 indicating a start position of a frame, a P2 preamble symbol 280 for transmission layer 1 (L1) signaling, and data symbols 290 for transmitting a broadcast signal.

According to an exemplary embodiment of the inventive concept, the transmitter 100 illustrated in FIG. 1 may support a DVB-T2 system and is compatible with the system. The frame generator 110 of the transmitter 100 may generate a T2 frame which includes various data to be transmitted.

The preamble inserter 120 of the transmitter 100 may insert a preamble in a frame.

In addition, when a preset emergency alert event occurs, the preamble inserter 120 may insert, in the preamble, at least a portion of an emergency alert service (EAS) message indicating the emergency alert event, add an additional preamble including the remaining portion of the EAS message to the preamble, and change an indicator value contained in the preamble to display whether the additional preamble is inserted.

For example, the preamble inserter 120 may use a P2 preamble symbol used in the aforementioned DVB-T2 method as the additional preamble including the EAS message. For another example, the preamble inserter 120 may insert the remaining portion of the EAS message in the P2 preamble.

A preset emergency alert event includes a case in which a disaster occurs, a case in which war occurs, a case in which information needs to be quickly indicated in an emergency state, and so on.

For example, when large tidal waves occur, the preamble inserter 120 may add an EAS message indicating information about the tidal waves or an additional preamble including the EAS message indicating information about the tidal waves to a preamble and transmit the preamble.

In addition, the preamble inserter 120 may change an indicator value contained in the preamble to display that the EAS message or the additional preamble including the EAS message is inserted in the preamble.

That is, when an emergency alert event occurs, a communication state may become poor. In order to overcome the poor communication state, the EAS message may be inserted in the preamble instead of inserting the EAS message directly in data and transmitting the data, and thus, the EAS message using an L1 signal in the preamble may be directly transmitted to achieve robust transmission.

The transmitter 100 may detect whether a preset emergency alert event occurs via a sensor, or the emergency alert event may be set directly by the user.

For example, when the transmitter 100 includes a measurement sensor (not shown) for measuring earthquake intensity, if the earthquake measurement sensor (not shown) detects earthquake, the preamble inserter 120 may insert at least a portion of an EAS message indicating occurrence of earthquake in the preamble, add a remaining portion of the EAS message or an additional preamble including the remaining portion of the EAS message to the preamble, and change an indicator value contained in the preamble to display whether the EAS message or the additional preamble including the EAS message is inserted.

In addition, when the user directly inputs information indicating occurrence of earthquake to an input unit (not shown) of the transmitter 100, the preamble inserter 120 may insert at least a portion of an EAS message indicating occurrence of earthquake in the preamble, add a remaining portion of the EAS message or an additional preamble including the remaining portion of the EAS message to the preamble, and change an indicator value contained in the preamble to display whether the EAS message or the additional preamble including the EAS message is inserted.

While inserting a preamble in a frame, if a preset emergency alert event occurs, the preamble inserter 120 may insert at least a portion of an emergency alert service (EAS) message indicating the emergency alert event in the preamble and add a remaining portion of the EAS message or an additional preamble including the remaining portion of the EAS message to the preamble. Alternatively, the preamble inserter 120 may include a first preamble inserter and a second preamble inserter, the first preamble inserter may generate a preamble and insert the preamble in a frame, and the second preamble inserter may generate an additional preamble and insert the additional preamble in the frame.

Hereinafter, exemplary embodiments of the inventive concept are described with respect to a case in which the additional preamble includes an EAS message instead of a case in which the EAS message is included in the preamble without generating the additional preamble. However, these embodiments may be modified to be applied the case in which the EAS message is included in the preamble without generating the additional preamble.

Figure 3A:
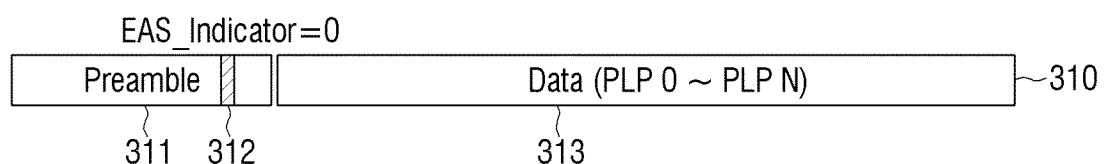
FIG. 3A is a diagram illustrating a frame in which an additional preamble is not inserted.
Figure 3B:
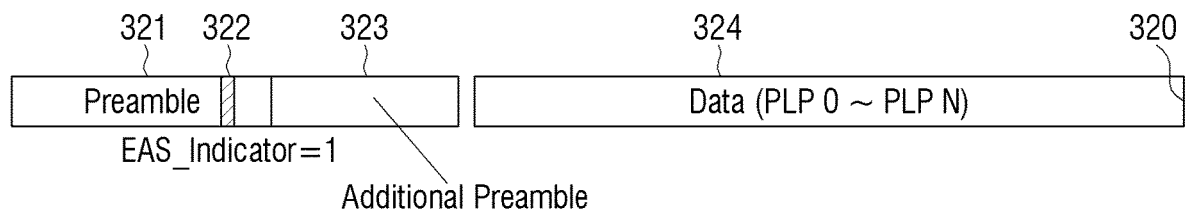
FIG. 3B is a diagram illustrating a frame in which an additional preamble is inserted, according to exemplary embodiments of the inventive concept.

FIG. 3A is a diagram illustrating a frame in which an additional preamble is not inserted, and FIG. 3B is a diagram illustrating a frame in which an additional preamble is inserted, according to exemplary embodiments of the inventive concept.

Referring to FIG. 3A, a frame 310 may include a preamble 311 and data 313. The frame 310 may be a T2 frame of DVB-T2.

In the preamble 311, an EAS indicator 312 is included to indicate whether an additional preamble including at least a portion of an EAS message or EAS information is inserted in the preamble 311.

Here, the EAS indicator 312 inserted in the preamble 311 of the frame 310 is set to zero (0) to indicate that the additional preamble is not inserted in the preamble 311, and thus, the frame 310 is a transmission frame transmitted by the transmitter 100 at an ordinary time, but not in the case in which a disaster occurs.

Referring to FIG. 3B, a frame 320 may include a preamble 321, an additional preamble 323, and data 324. The frame 320 may also be a T2 frame.

In the preamble 321, an EAS indicator 322 is included to indicate whether the additional preamble 323 including at least a portion of an EAS message or EAS information is inserted in the preamble 321.

Here, the EAS indicator 322 inserted in the preamble 321 of the frame 320 is set to one (1) to indicate that the additional preamble 323 is inserted, and thus, the frame 320 may be a transmission frame transmitted by the transmitter 100 when a disaster occurs.

The at least a portion of the EAS message (hereafter referred to as "the EAS message") may include location information indicating a data location of an emergency alert event in a region of the data 324 in the frame 320.

In detail, the EAS message may include only simple summary information about the emergency alert event, and data about the emergency alert event included in data of T2 frames may include detailed information about the emergency alert event.

For example, the EAS message may include only simple information about a type or area of the emergency alert event, and the data about the emergency alert event included in the data of T2 frames may include a picture, image, or sound of the emergency alert event, or information about a shelter location.

The preamble inserter 120 in FIG. 1 may add in-band information to a data region in a frame such as the frame 320. The in-band information may be indicated by the location information included in the EAS message.

The in-band information may indicate a data location associated with or related to the emergency alert event in data of subsequent frames to a current frame, e.g., the frame 320.

That is, the preamble inserter 120 adds in-band information to a data region indicated by location information included in the EAS message to indicate a data location of an emergency alert event. Here, the in-band information added to the data region may include information about a location of data related to the emergency alert event in a data region in a frame subsequent to a currently received frame, which will be described below in detail.

The EAS message may include at least one of Event_ID of the emergency alert event, Event_version indicating a version of the emergency alert event, Event_type indicating a type of the emergency alert event, Event_location indicating an area of the emergency alert event, Event_location_extension indicating detailed information about the area, Event_description and Event_description_length indicating the detailed information and size of the emergency alert event, and Relative_PLP_ID indicating an identifier (ID) of data associated with or related to the emergency alert event in a frame.

In addition, the EAS message may include in-band signaling indicating in-band information. Here, in-band signaling included in the EAS message to indicate in-band information and the in-band information contained in the data region are distinguishable from each other. The in-band signaling may correspond to the in-band signaling of DVB-T2.

In detail, the in-band signaling contained in the EAS message may indicate that in-band information is contained in the data region contained in the frame, and the in-band information contained in the data region may indicate a location of data associated with or related to the emergency alert event in a data region in subsequent frames to a currently transmitted or received frame.

FIG. 4 is a diagram illustrating a configuration of an EAS message according to an exemplary embodiment of the inventive concept.

Referring to FIG. 4, the EAS message may be configured in such a way that 16 bits are allocated to Event_ID of the emergency alert event, eight bits are allocated to Event_version indicating a version of the emergency alert event, eight bits are allocated to Event_type indicating a type of the emergency alert event, 16 bits are allocated to Event_location indicating an area of the emergency alert event, 16 bits are allocated to Event_location_extension indicating detailed information about the area, a multiple of eight bits and 32 bits are respectively allocated to Event_description and Event_description_length indicating the detailed information and size of the emergency alert event, eight bits are allocated to Relative_PLP_ID indicating an ID of data associated with or related to the emergency alert event in a frame, and a multiple of eight bits is allocated to in-band signaling indicating that in-band information is contained in a data region included in a frame.

For example, when the emergency alert event is a typhoon, the EAS message may include an ID indicating a natural disaster, a version of the EAS message, information indicating the typhoon among natural disasters, an area where the typhoon affects, detailed information about the area affected by the typhoon as necessary, a moving picture about the typhoon, an address for image or sound information, and in-band signaling as necessary.

That is, the EAS message may include summary information (version, type, area, and so on) about the typhoon. In addition, the EAS message may include information about a data location with respect to detailed information such as image or voice information, and thus, a reference may be made to a moving picture, image or voice information about the typhoon from data in the data location in frames.

The preamble inserter 120 illustrated in FIG. 1 may insert an additional preamble including the EAS message indicating the emergency alert event in a frame. Here, the preamble is used in the L1 Layer and does not have to be processed in the L2 Layer using a related art Advanced Television System Committee-Mobile/Handheld (ATSC-M/H) EAS System (A/153 Part 10). Thus, a receiver may receive the preamble directly from the L1 Layer and process the preamble, according to an exemplary embodiment of the inventive concept.

In addition, bit numbers allocated to the configuration of the EAS message of FIG. 4 may be changed according to a user setting.

When the additional preamble is added to the preamble, the preamble inserter 120 may set the EAS indicator value to one (1) as illustrated in FIG. 3B. When the additional preamble is not added to the preamble, the preamble inserter 120 may set the EAS indicator value to zero (0) as illustrated in FIG. 3A.

As illustrated in FIG. 3B, when the additional preamble 323 is added to the preamble 321, the preamble inserter 120 may set a value of the EAS indicator 322 included in the preamble 321 to one (1). In the case of the frame 310 to which the additional preamble 323 is not added, the preamble inserter 120 may set a value of the EAS indicator 312 included in the preamble 311 to zero (0).

FIG. 5 is a diagram illustrating an OFDM symbol structure of an additional preamble including an EAS message according to an exemplary embodiment of the inventive concept.

Referring to FIG. 5, when a P2 pilot structure of an 8K FFT size is used, one subcarrier is allocated to a P2 pilot per three subcarriers, and thus, an additional preamble may be mapped to 4,544 cells except for a pilot among 6,817 cells in total.

In addition, with respect to the generated additional preamble, frequency interleaving may be performed but time interleaving may not be performed, mapping may be performed via QPSK, a code parameter may be ⅕, and coding may be performed using a short code (16K).

In addition, Shortening and Puncturing may be used to be matched with the 4,544 cells.

In consideration of the number of subcarriers to which the aforementioned additional preamble is mapped and the code parameter, a maximum number of bits allocated to the EAS message is 1,649 bits, which corresponds to a size for transmitting two EAS messages with about 50 words.

Figure 6:
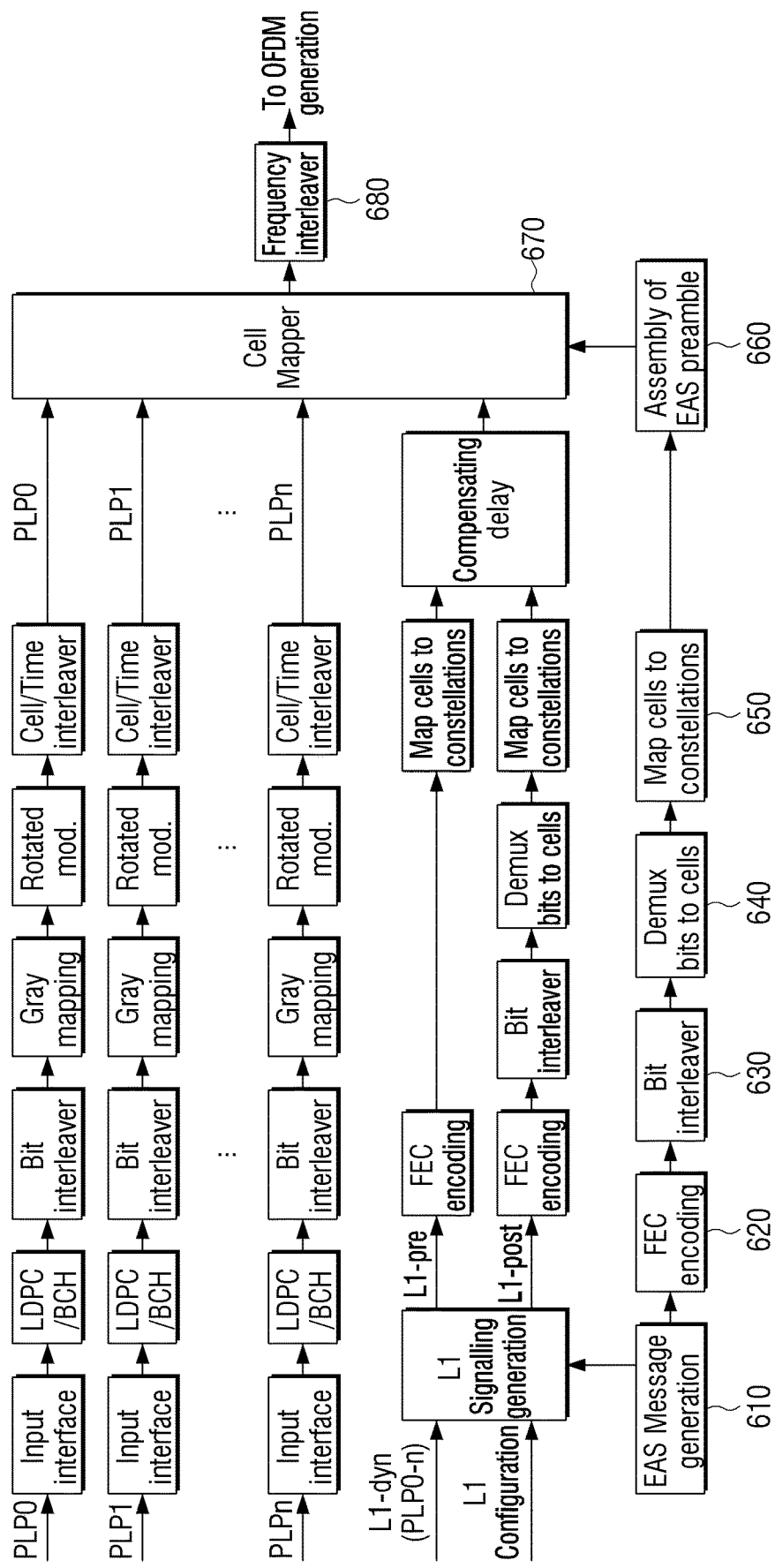
FIG. 6 is a block diagram of a procedure of processing an EAS message in a transmitter according to an exemplary embodiment of the inventive concept.

FIG. 6 is a block diagram of a procedure of processing an EAS message in a transmitter according to an exemplary embodiment of the inventive concept.

Referring to FIG. 6, data streams corresponding to PLP0 to PLPn are processed according to a DVB-T2 system. When an emergency alert event occurs, the preamble inserter 120 generates (610) an EAS message and transmits the EAS message to an L1 signaling generator. In addition, the remaining portion of the EAS message is FEC encoded (620) and bit-interleaved via a bit interleaver. Then, the bits are extracted (640) on a cell basis, and the cells are mapped to constellations (650).

In addition, a cell mapper (670) maps an EAS preamble (660) (which is defined as the same as an additional preamble herein) on which constellation mapping (650) is performed to a frame. Frequency interleaving is performed on the EAS preamble (660) mapped to the frame via a frequency interleaver 680 to form an OFDM symbol.

As seen from FIG. 6, as described with reference to FIG. 5, the procedure for generating and processing the EAS message may include a frequency interleaving without cell/time interleaving.

Figure 7:
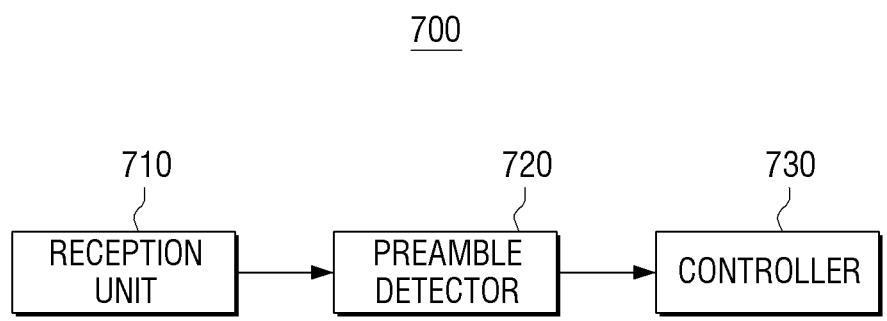
FIG. 7 is a block diagram illustrating a structure of a receiver according to an exemplary embodiment of the inventive concept.

FIG. 7 is a block diagram illustrating a structure of a receiver 700 according to an exemplary embodiment of the inventive concept.

Referring to FIG. 7, the receiver 700 may include a reception unit 710 and a preamble detector 720.

The reception unit 710 may receive a frame including a preamble and data.

In addition, the preamble detector 720 determine whether an additional preamble including an EAS message is present in the preamble according to an indicator value of the preamble, and extracts the EAS message related to a preset emergency alert event from the additional preamble based on the determination result.

In detail, upon receiving the frame 320 of FIG. 3B via the reception unit 710, the preamble detector 720 may read a value of the indicator 322 in the preamble 321 and determine that the additional preamble 323 including the EAS message is present in the preamble 321 when the value of the indicator 322 is one (1).

In addition, the preamble detector 720 may extract the EAS message indicating the preset emergency alert event from the additional preamble 323. Here, a location of the additional preamble 323 may predetermined between the transmitter 100 of FIG. 1 and the receiver 700.

The preamble detector 720 may include a first preamble detector (not shown) for detecting a preamble, and a second preamble detector (not shown) for determining whether an additional preamble is inserted and detecting the additional preamble according to an indicator value in the preamble.

That is, upon receiving the frame, the first preamble detector may detect the preamble from the frame, and the second preamble detector may determine whether the additional preamble is inserted according to an indicator value of the detected preamble and detect the additional preamble.

As described with regard to the transmitter 100 of FIG. 1, the EAS message may include location information about a data location of the emergency alert event in a data region of a frame.

The receiver 700 may further include a controller 730 for detecting data about the emergency alert event from the data region of the frame based on the location information. According to an exemplary embodiment, the controller may be implemented as a sub-element of the preamble detector 720.

In detail, the controller 730 may search for data in the data region about the emergency alert event with reference to location information contained in the EAS message to indicate the data location of the emergency alert event in the data region.

Here, the data about the emergency alert event may include detailed information about the emergency alert event When in-band information is present in data in a data region of a current frame, the controller 730 may detect data of the emergency alert event from a data region of a frame subsequent to the current frame according to the in-band information. The frame subsequent to the current frame may be a frame received after the current frame at the reception unit 710 shown in FIG. 7.

That is, the in-band information may indicate a location of data associated with or related to the emergency alert event in data regions of subsequent frames.

Figure 8:
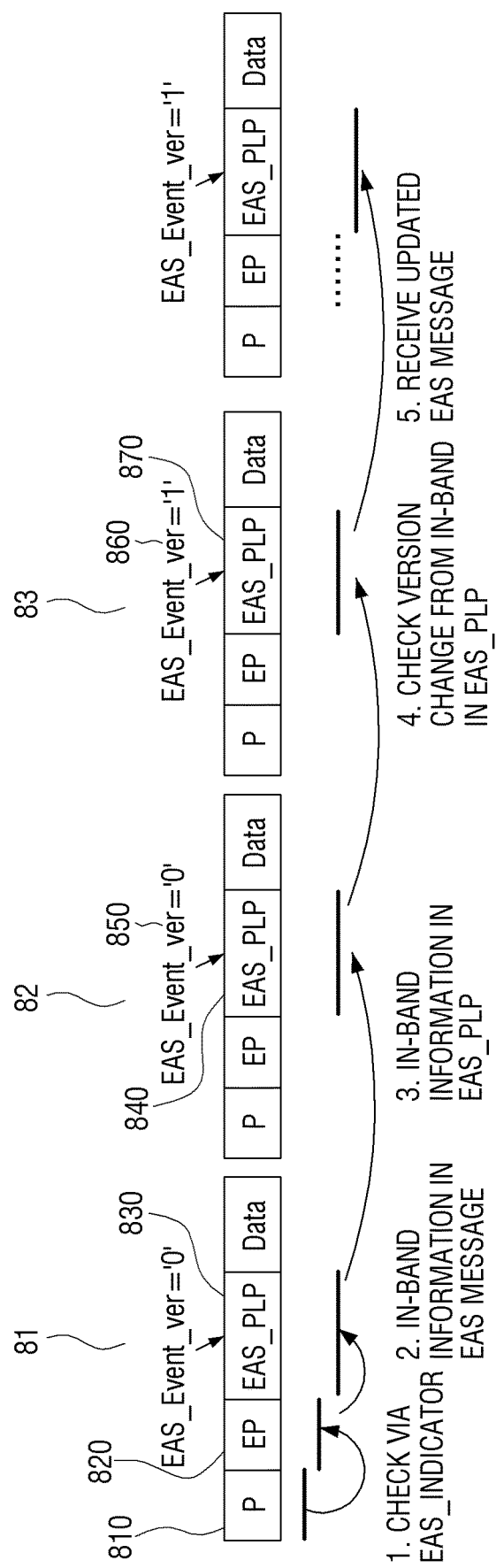
FIG. 8 is a diagram illustrating a procedure of detecting data related to an emergency alert event with reference to in-band information according to an exemplary embodiment of the inventive concept.

FIG. 8 is a diagram illustrating a procedure of detecting data related to an emergency alert event with reference to in-band information, according to an exemplary embodiment of the inventive concept.

Referring to FIG. 8, the preamble detector 720 in FIG. 7 may detect an additional preamble 820 including an EAS message via an indicator included in a preamble 810 of a first frame 81.

In addition, the controller 730 in FIG. 7 may detect data 830 about the emergency alert event with reference to Relative_PLP_ID indicating an ID of data associated with or related to the emergency alert event and contained in the EAS message.

In addition, the controller 730 may detect data 840 associated with the emergency alert event in a data region of a second frame 82 subsequent to the first frame 81 based on in-band information included in the data 830 about the emergency alert event.

That is, when the in-band information is included in the data 830 about the emergency alert event, the controller 730 may directly detect the data 840 associated with the emergency alert event without referring to preambles and additional preambles of all received frames.

When the in-band information is included in the data 830 about the emergency alert event, information indicating that the in-band information is included in the in-band signaling of the EAS message may be included in the additional preamble 820, the data 830 or elsewhere in the first frame 81.

In addition, the EAS message may include at least one of Event_ID of the emergency alert event, Event_version indicating a version of the emergency alert event, Event_type indicating a type of the emergency alert event, Event_location indicating an area of the emergency alert event, Event_location_extension indicating detailed information about the area, Event_description and Event_description_length indicating the detailed information and size of the emergency alert event, and Relative_PLP_ID indicating an ID of data related to or associated with the emergency alert event in the first frame 81.

The in-band information may include information about a version of the EAS message. Here, the information about the version of the EAS message may include information indicating whether it is an updated EAS message version.

In addition, when the EAS message version is changed, the controller 730 may receive and process the EAS message according to the changed version.

In detail, referring to FIG. 8, while the controller 730 detects the data 840 associated with the emergency alert event in the data region of the second frame 82 subsequent to the first frame 81 based on the in-band information included in the detected data 830 about the emergency alert event, the data 840 associated with the emergency alert event in the data region of the second frame may include another in-band information, and the controller 730 may detect data 870 associated with the emergency alert event in a data region of a third frame 83 subsequent to the second frame 82 based on the other in-band information included in the data 840.

Here, the in-band information included in the data 840 associated with the emergency alert event in the data region of the second frame 82 may include an EAS_Event_version field. The controller 730 may determine a version of a current EAS message according to a value set in the EAS_Event_version field.

That is, since a value of the EAS_Event_version field 850 of the data 840 associated with the emergency alert event in the data region of the second frame 82 is zero (0), but a value of an EAS_Event_version field 860 of data 870 associated with the emergency alert event in data regions of other frames including the third frame 83 subsequent to the second frame 82 is one (1), the controller 730 may determine that the version of the current EAS message is changed, and thus, the updated EAS message may be received. The updated EAS message may indicate a changed state of a previous emergency alert event or a different emergency alert event.

In addition, a procedure of determining whether the version of the EAS message is changed may be simultaneously performed with a procedure of detecting data with reference to in-band information.

When an indicator value included in the preamble 810 in the first frame 81 is one (1), the preamble detector 720 may determine that the additional preamble 820 is inserted. When the indicator value is zero (0), the preamble detector 720 may determine that the additional preamble 820 is not inserted. The indicator value may be changed according to a user setting and may be previously set between the transmitter 100 and the receiver 700.

Figure 9:
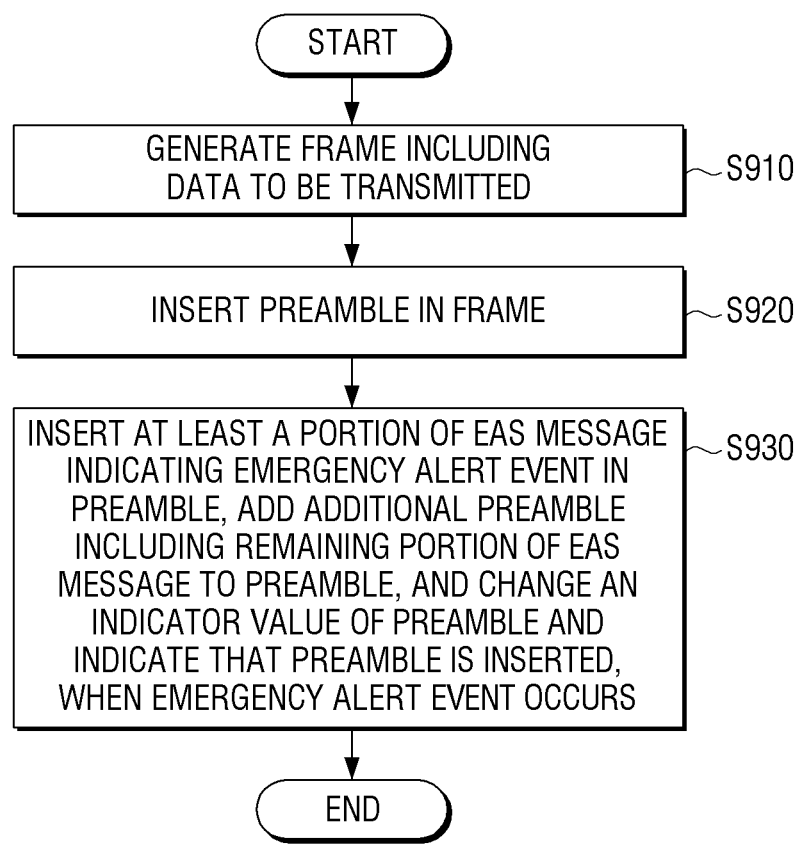
FIG. 9 is a flowchart for explanation of a controlling method of a transmitter according to an exemplary embodiment of the inventive concept.

FIG. 9 is a flowchart for explanation of a controlling method of a transmitter according to an exemplary embodiment of the inventive concept.

In the method illustrated in FIG. 9, a current frame including data to be transmitted may be generated (S910).

A preamble may be inserted in the frame (S920).

When a preset emergency alert event occurs, at least a portion of an EAS message indicating the emergency alert event may be inserted in the preamble, an additional preamble including the remaining portion of the EAS message may be added to the preamble, and an indicator value in the preamble may be changed to indicate that the additional preamble is inserted (S930).

Here, the EAS message may include location information about a data location of the emergency alert event in a data region of the current frame.

Along with indicating the additional preamble is inserted, in-band information may be added to the data region of the current frame indicated by the location information. The in-band information may include information indicating a location of data associated with the emergency alert event in a data region of a frame subsequent to the current frame.

The EAS message may include at least one of Event_ID of the emergency alert event, Event_version indicating a version of the emergency alert event, Event_type indicating a type of the emergency alert event, Event_location indicating an area of the emergency alert event, Event_location_extension indicating detailed information about the area, Event_description and Event_description_length indicating the detailed information and size of the emergency alert event, and Relative_PLP_ID indicating an ID of data related to or associated with the emergency alert event in the current frame.

For the indication of whether the additional preamble is inserted, if the additional preamble is added to the preamble, an indicator value may be set to one (1), and if the additional preamble is not added to the preamble, the indicator value may be set to zero (0).

Figure 10:
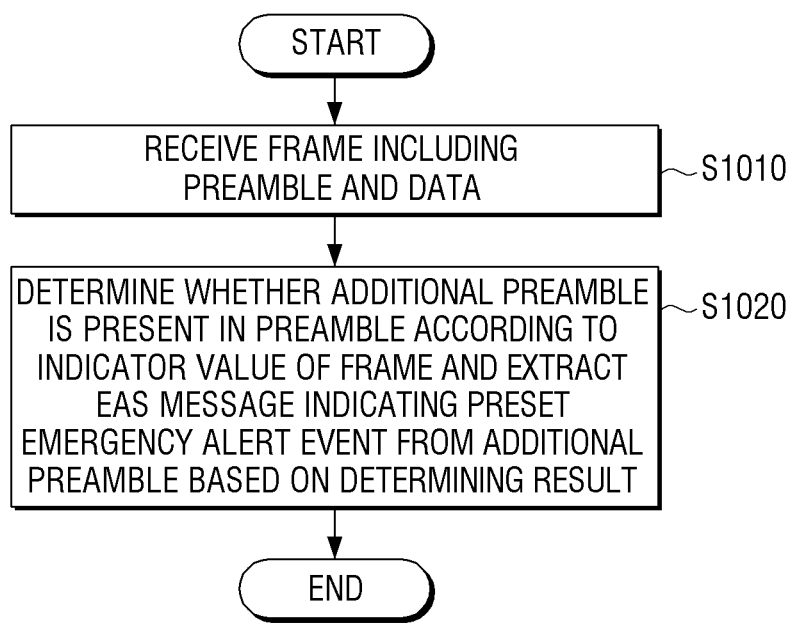
FIG. 10 is a flowchart for explanation of a controlling method of a receiver according to an exemplary embodiment of the inventive concept.

FIG. 10 is a flowchart for explanation of a controlling method of a receiver according to an exemplary embodiment of the inventive concept.

In the method illustrated in FIG. 10, a frame including a preamble and data may be received (S1010).

In addition, whether an additional preamble is present in the preamble is determined according to an indicator value in the preamble, and an EAS message indicating a preset emergency alert event may be extracted from the additional preamble based on the determination result (S1020).

Here, the EAS message may include location information about a location of data associated or related to the emergency alert event in a data region of the received frame.

The method illustrated in FIG. 10 may further include detecting data about the emergency alert event from the data region of the received frame based on the location information.

The data in the date region of the received frame may include in-band information indicating a location of data associated with the emergency alert event in a data region of frames subsequent to the received frame.

The EAS message may include at least one of Event_ID of the emergency alert event, Event_version indicating a version of the emergency alert event, Event_type indicating a type of the emergency alert event, Event_location indicating an area of the emergency alert event, Event_location_extension indicating detailed information about the area, Event_description and Event_description_length indicating the detailed information and size of the emergency alert event, and Relative_PLP_ID indicating an ID of data related to or associated with the emergency alert event in the received frame.

In addition, the in-band information may include information about a version of the EAS message. When the EAS message version is changed, the method illustrated in FIG. 10 may further include receiving and processing the EAS message according to the changed version.

In determining of whether the additional preamble is present, if an indicator value is one (1), it may be determined that the additional preamble is inserted, and if the indicator value is zero (0), it may be determined that that the additional preamble is not inserted.

Figure 11:
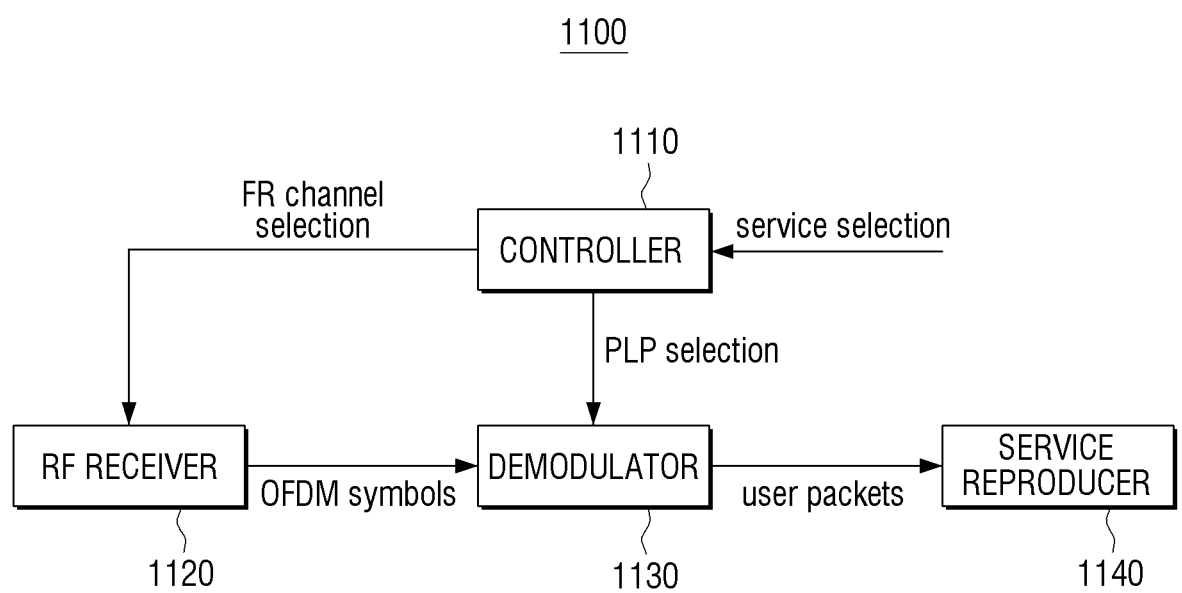
FIG. 11 is a block diagram demonstrating a configuration of a receiving apparatus according to an exemplary embodiment.

FIG. 11 is a block diagram demonstrating a configuration of a receiving apparatus according to an exemplary embodiment.

Referring to FIG. 11, a receiving apparatus 1100 may comprise a controller 1110, an RF receiver 1120, a demodulator 1130 and a service regenerator 1140.

The controller 1110 determines an RF channel and a PLP through which a selected service is transmitted. Herein, the RF channel may be specified to a center frequency and a bandwidth, and the PLP may be specified to its PLP ID. A specific service may be transmitted through at least one PLP which falls into the category of at least more than one of RF channels, for each component constituting a service. Hereinafter, for the sake of convenience of explanation, assume that all of data needed to play back one service is transmitted as one PLP which is transmitted through one RF channel. In other words, a service has only one data obtaining path for reproduce the service, and the data obtaining path is specified to a RF channel and a PLP.

The RF receiver 1120 detects an RF signal from an RF channel selected by a controller 1110 and delivers OFDM symbols which are extracted by performing a signal processing to an RF signal to the demodulator 1130. Herein, signal processing may include synchronization, channel estimation, equalization, etc. Information for signal processing, a value predetermined by a transmitter/receiver according to a use and implementation thereof, is included in a predetermined OFDM symbol among OFDM symbols and then transmitted to a receiver.

The demodulator 1130 performs signal processing for OFDM symbols, extracts user packet and delivers the user packet to a service reproducer 1140, and the service reproducer 1140 uses the user packet to reproduce and then output a service selected by a user. Here, a format of the user packet may differ depending on a service implementation method and may be, for example, a TS packet or a IPv4 packet.

Figure 12:
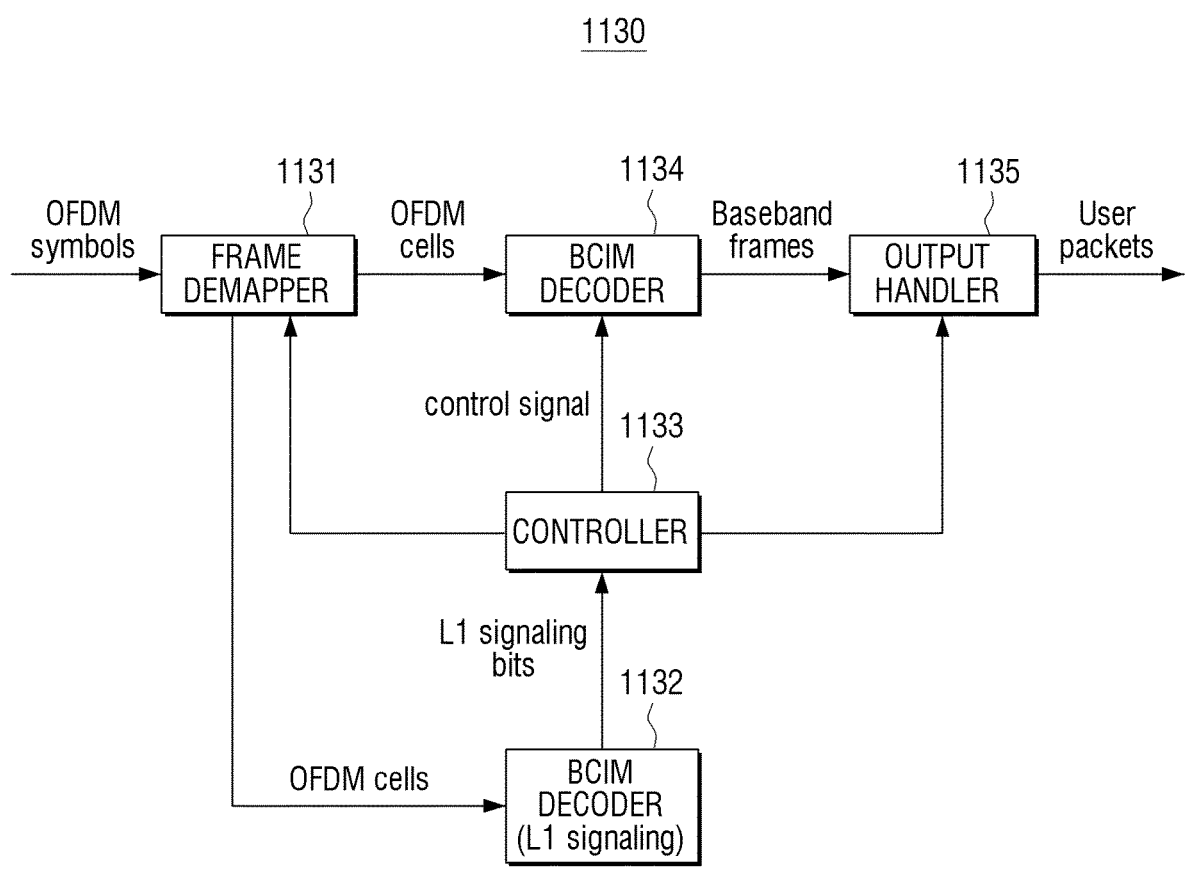
FIG. 12 is a block diagram demonstrating a demodulator 1130 in detail according to an exemplary embodiment.

FIG. 12 is a block diagram demonstrating a demodulator 1130 in detail according to an exemplary embodiment.

Referring to FIG. 12, the demodulator 1130 may be comprised by including a Frame demapper (1131), a BICM decoder for L1 signaling (1132), a controller 1133, a BICM decoder (1134) and output handler (1135).

The frame demapper 1131 selects OFDM cell constituting FEC blocks which belongs to a PLP selected in a frame consisting of OFDM symbol, based on control information delivered by the controller 1133 and delivers the selected OFDM cella to a BICM decoder (1134). It also selects OFDM cells corresponding to more than one of FEC blocks which include L1 signaling, and delivers them to a BICM decoder (1134) for L1 signaling.

The BICM decoder for L1 signaling (1132) signal processes an OFDM cell which falls into the category of an FEC block which includes L1 signaling, extracts L1 signaling bits and delivers the L1 signaling bits to the controller (1133). In this case, the signal processing may include a process of extracting an LLR (log-likelihood ratio) value for decoding an LDPC codeword and a process of using the extracted LLR value to decode the LDPC codeword.

The controller 1133 extracts a L1 signaling table from the L1 signaling bits and uses a L1 signaling table value to control operations of the frame demapper (1131), the BICM decoder (1134) and the output handler (1135). For the same of explanation, FIG. 12 illustrates that the BICM decoder for L1 signaling (1132) does not use control information of the controller (1133). However, when the L1 signaling has a layer structure similar to the layer structure of the above-described L1-PRE and L1-POST, it is obvious that the BICM decoder for L1 signaling (1132) may be composed of at least one BICM decoding block and operation of the BICM decoding block and the frame demapper (1131) may be controlled by L1 signaling information of upper layer.

The BICM decoder (1134) signal processes OFDM cells constituting FEC blocks which belongs to selected PLP to extract baseband frames and delivers the baseband frames to the output handler (1135). In this case, the signal processing may include a process of extracting an LLR (log-likelihood ratio) value for decoding an LDPC codeword and a process of using the extracted LLR value to decode the LDPC codeword, which may be performed based on control information delivered to the controller 1133.

The output handler (1135) signal processes baseband frame, extracts a user packet and delivers the extracted user packet to a service reproducer. In this case, signal processing may be performed based on control information delivered by the controller 1133.

According to an exemplary embodiment, L1 signaling includes kinds of a user packet transmitted through the corresponding PLP and information on operations used for encapsulating the user packet to a baseband frame. Herein, the information includes control information which the controller 1133 delivers to the output handler 1135. The output handler 1135 extracts a user packet from a baseband frame received based on the control information.

According to an exemplary embodiment, the L1 signaling may include, in particular, information on ISSY mode, information on a buffer size of a receiver required according to the ISSY mode and information on the time when a first user packet of the PLP included in the frame. Herein, the information is included in control information which the controller 1133 delivers to the output handler 1135. The output handler 1135 stores the control information in a buffer based on the control information and delivers the user packet to a service reproducer at a predetermined time.

FIG. 13 is a flowchart provided to briefly demonstrate an operation of a receiving apparatus from the moment when a user selects a service until the actally selected service is reproduced, according to an exemplary embodiment.

Suppose that service information on the whole service selectable are acquired at the Initial scan (S1300) stage prior to user's service selection (S1310). Herein, the service information may include information on RF channel and PLP which transmits necessary data to reproduce specific service in the current broadcasting system. As an example of the service information, PSI/SI (Program-Specific Information/Service Information) in MPEG2-TS is available, and normally can be achieved through L2 signaling and the upper class signaling.

In the Initial scan (S1300) stage following an exemplary embodiment, comprehensive information on payload type of PLPs which are transmitted to a specific frequency band. As an example, there may be information on whether every PLP transmitted to the frequency includes specific type of data.

When user selects service (S1310), a receiver transforms the chosen service to the transmitting frequency and performs RF signaling detection (S1330). In the transforming process (S1320), the service information may be used.

When RF signaling is detected, the receiver performs the L1 signaling extract operation from the detected RF (S1340). Then it selects PLP to transit the chosen service, through the extracted L1 signaling (S1350), and extracts baseband frame from the selected PLP (S1360). In the process, the service information may be used.

The process to extract baseband frame (S1360) may include the process to demap the transmitted frame and select OFDM cells which fall to the PLP, to extract LLR (log-likelihood ratio) value for LDPC sign/decoding from OFDM cell, and to decode the LDPC sign using the extracted LLR value.

The receiver, using the header information of the extracted baseband frame, operates baseband packet extract from the baseband frame (S1370), and using the header information on the extracted baseband packet, performs user packet extract from the extracted brand packet (S1380). The extracted user packet is used to reproduce the chosen service (S1390). In the baseband packet extract process (S1370) and user packet extract process (S1380), L1 signaling information acquired in the L1 signaling extract (S1340) stage may be used.

According to an exemplary embodiment, L1 signaling includes information on the types of user packet transmitted through the corresponding PLP, and operation used to encapsulate user packet to baseband frame. At that time, the concerned information may be used in the user packet extract (S1380) process. Specifically, the concerned information may be used to extract user packet the reverse processes of operations used in the encapsulation.

According to an exemplary embodiment, L1 signaling may include information on ISSY mode information, buffer size of the recover required following ISSY mode information, and the output time of the 1st user packet of the corresponding PLP included in the frame. At that time, the concerned information may be used to control buffer in the user packet extract (S1380) process. Specifically, the concerned information may be used to control the buffer size to hold the extracted user packet and the time to output user packet with a service reproducer.

According to an exemplary embodiment, a non-transitory computer readable medium that stores the controlling method described in reference to FIG. 9 or FIG. 10 may be provided.

For example, a non-transitory computer readable medium may store a program for execution of generating of a frame including data to be transmitted, inserting a preamble into the frame, adding an additional preamble including a preset EAS message about an emergency alert event to the preamble when the preset emergency alert event occurs, and changing an indicator value included in the preamble.

In addition, for example, a non-transitory computer readable medium may store a program for execution of determining whether the additional preamble is present in a preamble according to an indicator value in the preamble included in a received frame and extracting an EAS message indicating a preset emergency alert event from the additional preamble The non-transitory computer readable medium is a medium that permanently or semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

Components, elements or units represented by a block as illustrated in FIGS. 1, 2A, 6 and 7 may be embodied as one or more various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like. Although the block diagrams in FIGS. 1, 2A, 6 and 7 do not illustrate a bus, components of these component, elements or units may communicate with one another via the bus.

The foregoing exemplary embodiments and advantages are merely exemplary and are not to be construed as limiting the inventive concept. The present teaching can be readily applied to other types of apparatuses. Also, the description of the exemplary embodiments of the inventive concept is intended to be illustrative, and not to limit the scope of the claims, and many alternatives, modifications, and variations will be apparent to those skilled in the art.

What is claimed is:

1. A transmitter comprising:
a processor configured to generate a frame comprising a preamble and data; and
a transmitter configured to transmit the frame,
wherein the preamble comprises an indicator to indicate whether an emergency alert service (EAS) information is inserted in the frame,
wherein the processor is configured to:
when an emergency alert event does not occur, set the indicator in the preamble to a first value for indicating that the EAS information is not inserted in the frame, and generate the frame comprising the preamble and the data, and
when the emergency alert event occurs, generate an additional preamble, insert the EAS information in the additional preamble and the data, set the indicator in the preamble to a second value for indicating that the EAS information is inserted in the frame, and generate the frame comprising the preamble, the additional preamble and the data, and
wherein the EAS information of the additional preamble comprises summary information regarding to the emergency alert event, and the EAS information of the data comprises detailed information regarding to the emergency alert event.

2. The transmitter as claimed in claim 1, wherein the processor adds in-band information to the frame indicated by a position of the EAS information, and
wherein the in-band information includes information indicating a location of additional data related to the emergency alert event in a data area in at least one frame subsequent to the frame.

3. The transmitter as claimed in claim 1, wherein a size of the detailed information is greater than a size of the summary information.

4. The transmitter as claimed in claim 1, wherein the summary information comprises at least one of a type of the emergency alert event or an area of the emergency alert event, and
wherein the detailed information comprises at least one an image related to the emergency alert event or a sound related to the emergency alert event, or a location of a shelter related the emergency alert event.

5. A receiver comprising:
a reception unit configured to receive a frame from a transmitter; and
a processor configured to determine whether an emergency alert service (EAS) information is in the frame according to an indicator inserted in a preamble included in the frame, and obtain the EAS information from the frame,
wherein the preamble comprises an indicator to indicate whether the EAS information is inserted in the frame,
wherein the transmitter is configured to:
when an emergency alert event does not occur, set the indicator in the preamble to a first value for indicating that the EAS information is not inserted in the frame, and generate the frame comprising the preamble and data, and
when the emergency alert event occurs, generate an additional preamble, insert the EAS information to the additional preamble and the data, set the indicator in the preamble to a second value for indicating that the EAS information is inserted in the frame, and generate the frame comprising the preamble, the additional preamble and the data, and
wherein the EAS information of the additional preamble comprises summary information regarding to the emergency alert event, and the EAS information of the data comprises detailed information regarding to the emergency alert event.

6. The receiver as claimed in claim 5, wherein the processor detects additional data related to the emergency alert event from a data area of at least one frame subsequent to the frame according to in-band information included in the detected data; and
wherein the in-band information includes information indicating a location of the additional data in the at least one subsequent frame.

7. The receiver as claimed in claim 6,
wherein the in-band information comprises information about a version of the EAS information; and
wherein the processor receives and processes EAS information of a changed version when the version of the EAS information is changed.

8. The receiver as claimed in claim 5, wherein the processor detects the EAS information from a P2 symbol of a first frame which is a T2 frame used in Digital Video Broadcasting Second Generation Terrestrial (DVB-T2).

9. A controlling method of a transmitter, the method comprising:
generating a frame comprising a preamble and data; and
transmitting the frame,
wherein the preamble comprises an indicator to indicate whether an emergency alert service (EAS) information is inserted in the frame,
wherein the generating comprises:
when an emergency alert event does not occur, setting the indicator in the preamble to a first value for indicating that the EAS information is not inserted in the frame, and generating the frame comprising the preamble and the data, and
when the emergency alert event occurs, generating an additional preamble, inserting the EAS information in the additional preamble and the data, setting the indicator in the preamble to a second value for indicating that the EAS information is inserted in the frame, and generating the frame comprising the preamble, the additional preamble and the data, and
wherein the EAS information of the additional preamble comprises summary information regarding to the emergency alert event, and the EAS information of the data comprises detailed information regarding to the emergency alert event.

10. A controlling method of a receiver, the method comprising:
receiving a frame from a transmitter; and
determining whether an emergency alert service (EAS) information is in the frame according to an indicator inserted in a preamble included in the frame, and obtain the EAS information from the frame,
wherein the preamble comprises an indicator to indicate whether the EAS information is inserted in the frame,
wherein the transmitter is configured to:
when an emergency alert event does not occur, set the indicator in the preamble to a first value for indicating that the EAS information is not inserted in the frame, and generate the frame comprising the preamble and data, and
when the emergency alert event occurs, generate an additional preamble, insert the EAS information in the additional preamble and the data, set the indicator in the preamble to a second value for indicating that the EAS information is inserted in the frame, and generate the frame comprising the preamble, the additional preamble and the data, and
wherein the EAS information of the additional preamble comprises summary information regarding to the emergency alert event, and the EAS information of the data comprises detailed information regarding to the emergency alert event.

* * * * *